United States Patent [19]

Szpur

[11] 4,026,202
[45] May 31, 1977

[54] APPARATUS FOR AUTOMATICALLY PRODUCING WAFFLES AND SIMILAR FOOD ARTICLES

[76] Inventor: Roman Szpur, 2685 Culver Ave., Dayton, Ohio 45429

[22] Filed: Nov. 24, 1975

[21] Appl. No.: 634,363

[52] U.S. Cl. .................................. 99/355; 99/341; 99/404; 99/431; 99/443 C; 198/599; 426/498

[51] Int. Cl.² ................................. A47J 37/12

[58] Field of Search ............ 99/404, 405, 341, 352, 99/353, 354, 355, 356, 407, 409, 416, 443 C, 431, 442, 427; 425/436 R; 198/28, 131, 185; 426/439, 498, 512, 515, 474, 389

[56] References Cited

UNITED STATES PATENTS

| 1,781,411 | 11/1930 | Reiber | 99/427 |
|---|---|---|---|
| 2,576,633 | 11/1951 | Naylor | 198/28 |
| 2,614,485 | 10/1952 | Sinkwitz | 99/404 |
| 2,786,430 | 3/1957 | Robbins | 99/442 |
| 3,267,836 | 8/1966 | Yepis | 99/427 |
| 3,490,392 | 1/1970 | Ver Hoeven | 426/498 |
| 3,747,508 | 7/1973 | Elam | 99/442 |

Primary Examiner—Billy J. Wilhite
Attorney, Agent, or Firm—Jacox & Meckstroth

[57] ABSTRACT

An elongated endless conveyor unit extends in a horizontal plane and successively carries a plurality of article forming molds from a batter coating station through a hot oil within a cooking vessel located under the conveyor and then to a discharge station where the articles are successively removed from the molds. Each of the molds is connected to the conveyor by a corresponding arm assembly including a cam element which is actuated for rotating the arm to remove the mold and article from the oil. The batter is recirculated from a removable reservoir container to an overflow container removably supported within the reservoir container, and the overflow container has an adjustable side wall for precisely selecting the level of the batter relative to the path of the molds. Air is introduced into the batter supplied to the overflow container to maintain the batter at a uniform consistency, and the removal of the cooked articles from the molds is produced by impacting each arm and then passing the mold between a set of flexible stripping elements spaced on opposite sides of the mold path. The entire machine is constructed for convenient disassembly and reassembly to simplify cleaning of the machine.

13 Claims, 8 Drawing Figures

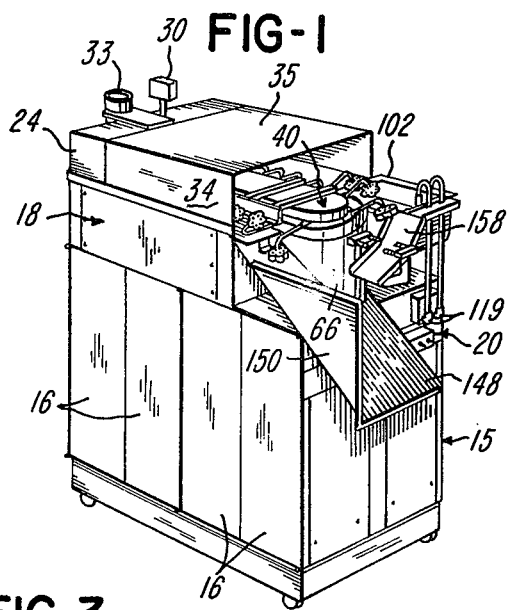
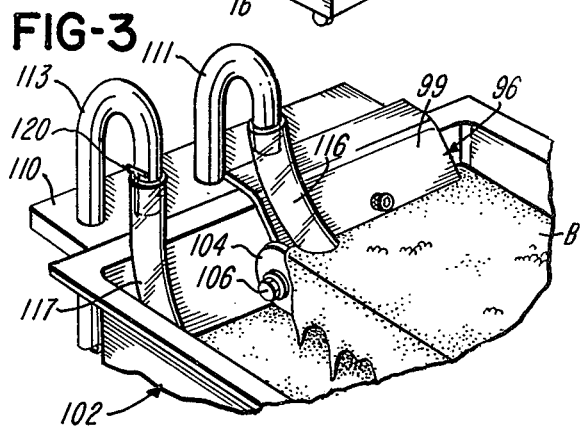
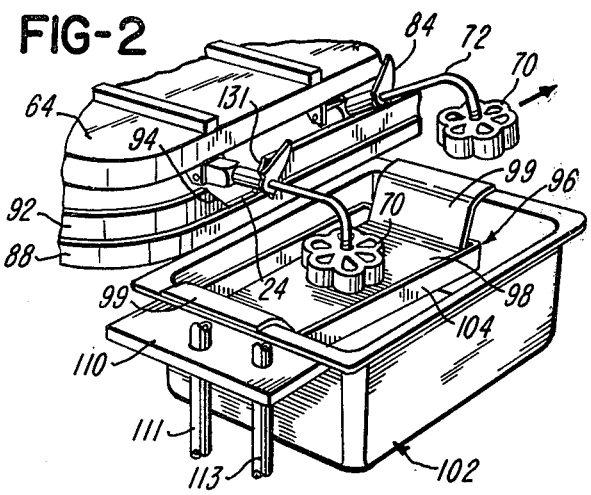
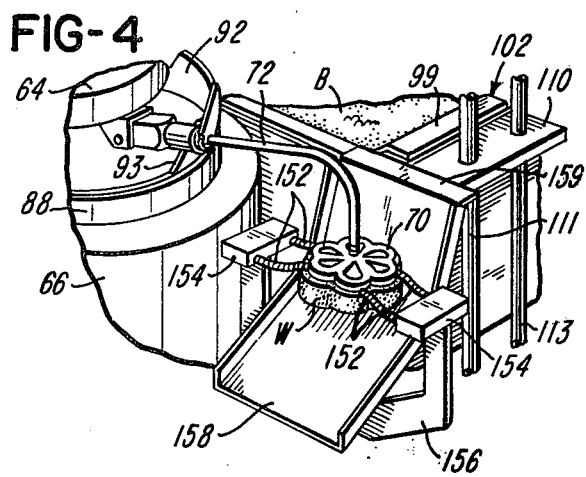
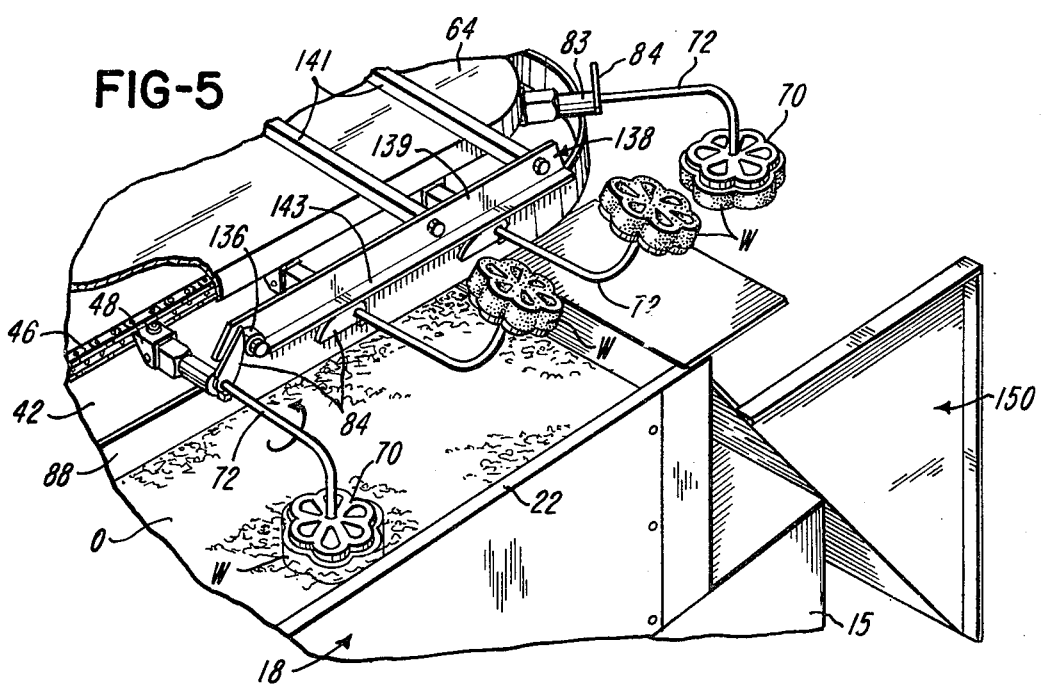

APPARATUS FOR AUTOMATICALLY PRODUCING WAFFLES AND SIMILAR FOOD ARTICLES

BACKGROUND OF THE INVENTION

The present invention relates to apparatus for automatically forming and cooking food articles such as commonly referred to as "circus waffles" and which are formed by dipping a heated metal mold into a fluid batter and then immersing the mold and coated layer of batter within a hot cooking oil for a predetermined time period. More specifically, the invention relates to improvements in the general form of apparatus disclosed in U.S. Pat. No. 2,614,485 which issued to J. C. Sinkwitz and applicant as coinventors. In such an apparatus, it has been found desirable for the apparatus or machine to have a high dependability of operation so that the operating and maintenance labor can be minimized and one operator can handle a plurality of machines. It has also been found desirable to minimize the floor space required for the apparatus and to provide the apparatus with components which can be quickly and conveniently disassembled and reassembled to facilitate cleaning. As another important feature, the machine should provide for precisely controlling the level of the batter with respect to the path of each mold when it is dipped or lowered into the batter and depending on the viscosity of the batter to assure that each mold is not submerged within the batter. In addition, it is desirable for the machine to provide for continuously aerating the batter so that is maintains a uniform consistency during the continuous operation of the machine.

SUMMARY OF THE INVENTION

The present invention is directed to an improved apparatus or machine for efficiently forming and cooking batter-type food articles and for successively delivering or discharging the cooked articles to a receiving bin or container with a minimum production of unacceptable articles. The apparatus of the invention further provides all of the desirable features mentioned above and, in addition, is convenient and simple to operate. These advantages and features are provided in the illustrated embodiment wherein an elongated chain conveyor is positioned in a horizontal plane with a major portion of the conveyor extending over a rectangular pan or vessel containing hot cooking oil.

A plurality of molds, corresponding to the configuration of the food article, are connected to the endless conveyor chain by corresponding rotatably supported arms each having a radially projecting cam element. As the molds travel around a generally oval path, the molds are successively dipped into a overflow container which receives a continuous supply of batter from a pump having an inlet connected to a reservoir container surrounding the overflow container. The overflow container is removably supported within the reservoir container and incorporates an adjustable side wall for precisely controlling the level of batter relative to the path of the molds. After the layer of batter on each mold is cooked within the oil for a predetermined time, the mold is rotated out of the cooking oil by actuation of the cam element and is delivered to a discharge station where the arm rotates and impacts a stop member. Flexible spring fingers then engage opposite sides of each mold and assure that the cooked article is stripped from the mold.

Other features and advantages of the machine will be apparent from the following description, the accompanying drawings and the appended claims.

BRIEF DESCRIPTION OF THE DRAWINGS

FIG. 1 is a perspective view of apparatus for producing waffle-type food articles and which is constructed in accordance with the invention;

FIG. 2 is a fragmentary perspective view illustrating the position of each mold and its support arm relative to the overflow and reservoir containers;

FIG. 3 is a fragmentary perspective view of the apparatus and illustrating the flow of batter from the overflow container into the reservoir container;

FIG. 4 is another fragmentary perspective view of the apparatus and illustrating the operation of stripping a cooked food product or waffle from its forming mold at the discharge station;

FIG. 5 is a further fragmentary perspective view of the apparatus and illustrating the operation of automatically removing the cooked waffles or food products from the cooking oil;

DESCRIPTION OF THE PREFERRED EMBODIMENT

Figure 6:
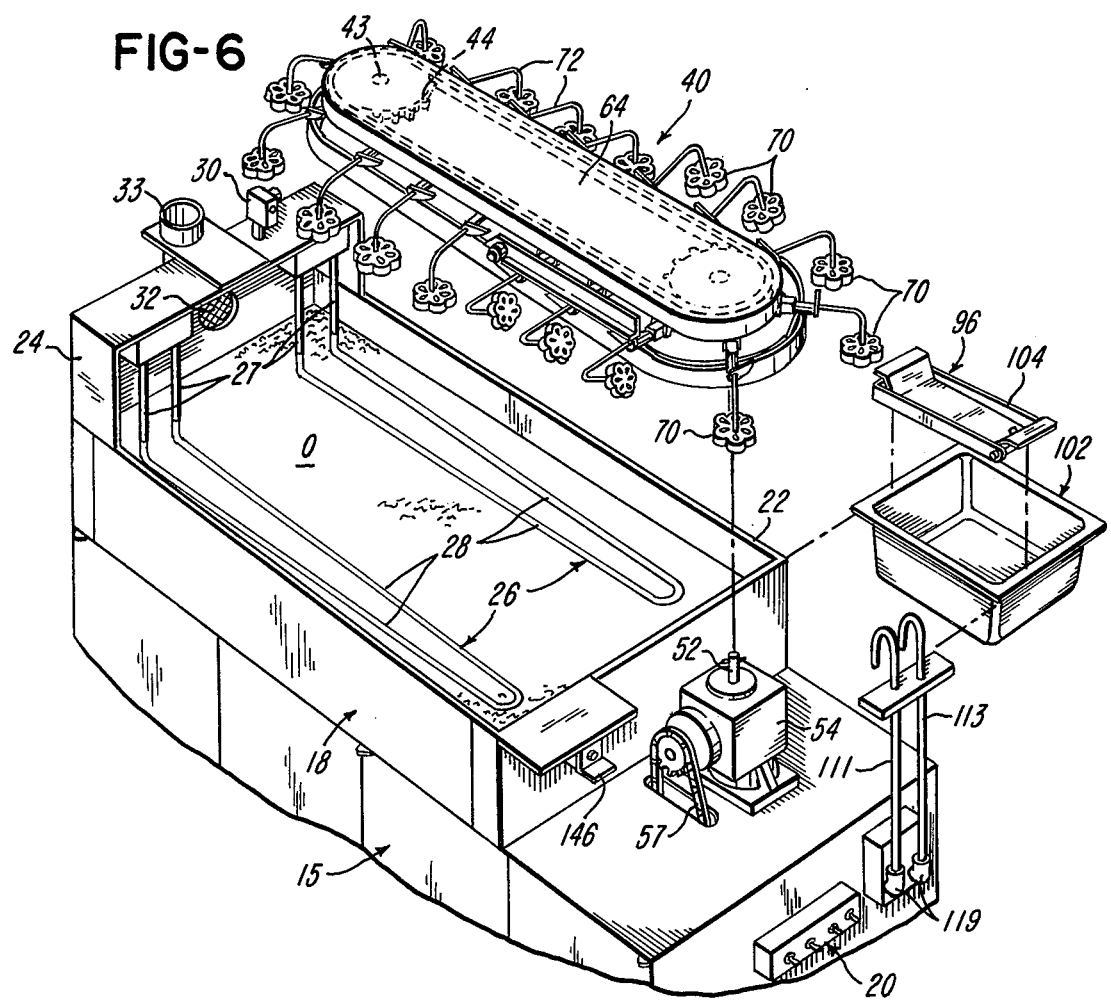
FIG. 6 is an exploded perspective view of the apparatus and illustrating how the apparatus is disassembled for cleaning.

Referring to the drawings, the automatic forming and cooking apparatus illustrated in FIG. 1 includes a rectangular metal base cabinet 15 which encloses a storage container (not shown) for cooking oil, a motor drive pump for supplying oil from the container, and also encloses a main drive motor and a motor driven recirculating pump, as will be described later. The base cabinet 15 has pivotally supported side doors 16 to provide for convenient access to the oil storage container, the drive motor and the motor driven pumps. A rectangular open top pan or vessel 18 is constructed of stainless steel sheet metal and is supported by the base cabinet 15 which is somewhat longer and projects to the front of vessel 18.

The cooking vessel 18 defines a rectangular chamber for receiving a predetermined volume of cooking oil which is supplied to the chamber through a line connected to a motor driven pump (not shown) having an inlet connected by flexible tube to the oil storage container within the base cabinet 15. The pump is controlled by a switch on the main control counsel 20 mounted on the front of the base cabinet 15. The cooking vessel 18 has an inwardly projecting and peripherally extending top flange 22 (FIG. 6), and a stainless steel sheet metal housing 24 is mounted on the rearward portion of the flange 22.

The housing 24 supports a pair of elongated sheath-type heating elements 26 (FIG. 6) each of which has an L-shaped configuration formed by vertical portions 27 which depend into the vessel 18 and support horizontal portions 28. The electric heating elements 26 are automatically controlled by a thermostat 30 which may be adjustably set by rotation of a control knob. The housing 24 also defines an exhaust outlet 32 which is connected to the inlet of a motor driven blower 33 mounted on the rear wall of the housing 24 for exhausting any smoke or fumes produced during the cooking operation. A pair of stainless steel sheet metal side panels 34 are also mounted on the top flange 22 of the vessel 18 and project forwardly from the housing 24 to support a removable transparent cover member 35 which provides for conveniently observing the cooking operation.

An elongated generally oval-shaped endless chain conveyor unit 40 (FIG. 6) extends horizontally with a major portion positioned over the open top cooking vessel 18. The conveyor unit 40 is supported by the front wall of the vessel 18 and a set of depending legs (not shown) which rest on the bottom wall of the vessel 18. The conveyor unit 40 includes an elongated oval-shaped base wall 42 on which is mounted a pair of bearings for rotatably supporting corresponding shafts 43 which carry a pair of end sprockets 44. An endless bicycle-type flexible chain 46 extends around the sprockets 44 and has generally parallel spaced horizontal runs. The chain 46 carries a set of longitudinally spaced U-shaped brackets 48 (FIG. 7) each of which is attached to a chain link by a screw 49.

Figure 7:
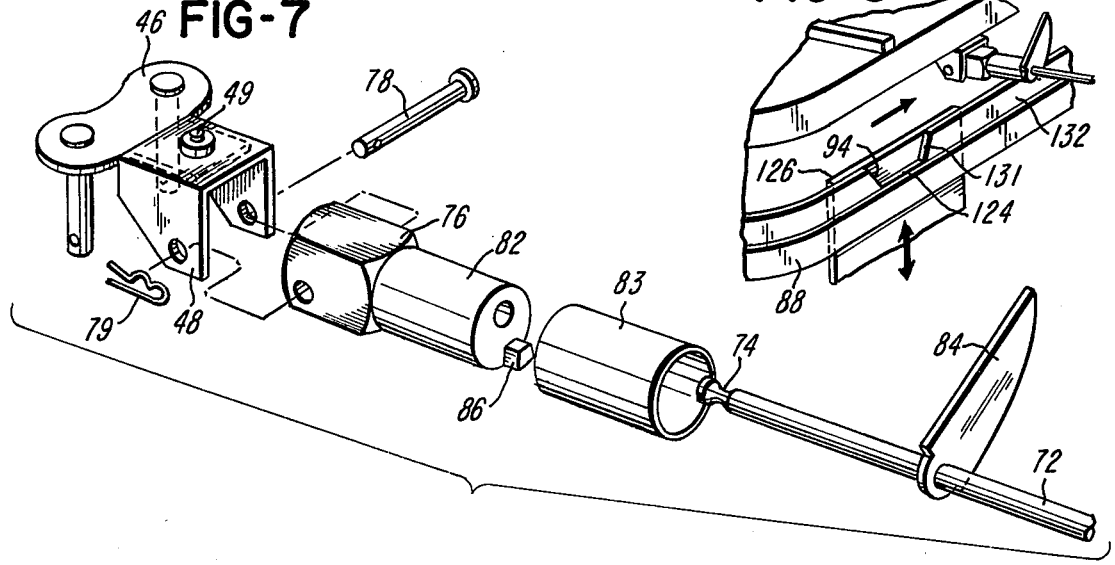
FIG. 7 is an exploded perspective view of a typical mold support arm assembly and showing its connection to the endless conveyor chain.

The forward semi-circular end portion of the conveyor unit 40 projects forwardly of the cooking vessel 18, and the shaft 43 supporting the forward end sprocket 44 projects downwardly through the base wall 42 and is connected by a socket-type coupling to an upwardly projecting output shaft 52 of a right angle gear reduced unit 54. The input shaft of the reducer unit 54 is driven by an endless chain drive 57 connected to the shaft of an electric conveyor drive motor which is enclosed within the base cabinet 15 and is controlled by a switch on the control console 20. As illustrated in FIG. 6, the endless conveyor chain 46 is covered by an elongated oval-shaped sheet metal cover member 64, and the gear reducer unit 54 is enclosed by a semi-cylindrical sheet metal housing 66 (FIG. 1) which extends downwardly from the forward end portion of the conveyor unit 40 to the top wall of the base cabinet 15.

Each of the U-shaped brackets 48 secured to the endless conveyor chain 46 carries a waffle forming mold 70 which is preferably formed of cast aluminum and has a configuration corresponding to the desired shape of the waffle-type food product W. Each of the molds 70 is supported by a corresponding J-shaped support rod or arm 72 which has one end portion threadably connected to the mold 70. The opposite end portion of each arm 72 has a circumferential groove 74 (FIG. 7) and is rotatably supported within a bore formed within a corresponding support block 76. Each block 76 projects into the corresponding bracket 48 and is pivotally connected to the bracket 48 by a corresponding pin-like shaft 78 which also extends tangentially through a portion of the groove 74 of the corresponding arm 72 to retain the arm within the support block 76.

Each pivot shaft 78 is releasably retained by a snap pin 79 which extends through a hole within the end of the shaft and permits each mold and arm assembly to be quickly disassembled for cleaning. Each arm support block 76 includes an integral cylindrical portion 82 which provides a bearing for a roller sleeve 83. The sleeve 83 is retained on the cylindrical portion 82 by a blade-like lever or cam member 84 which is rigidly secured to the arm 72 in a radial plane. Rotation of the arm 72 and the corresponding mold 70 is limited to approximately 225° by engagement of the cam member 84 with a stud 86 which projects axially from the cylindrical portion 82 of the support block 86 and is formed as an integral part of the support block.

When the conveyor chain 46 is driven in a counter-clockwise direction (looking down from the top) and the molds 70 are advanced in a generally oval path around the conveyor unit 40, the roller sleeves 83 normally ride on a peripherally extending rail or track 88. An arcuate cam track 92 is secured to the track 88 and projects upwardly from the forward end portion of the track 88. The cam track 92 has an inclined end surface 93 (FIG. 4) which serves to pivot each arm 72 upwardly adjacent the forward end of the conveyor unit 40 for successively elevating the molds 70.

The cam track 92 has a downwardly sloping opposite end surface 94 (FIG. 2) which provides for successively lowering the arms and molds 70 into a supply of batter B (FIG. 3) which is supplied to an overflow container 96. The overflow container 96 includes a formed tray-like sheet metal bottom wall 98 which extends to form a pair of upwardly and outwardly projecting ear portions 99 positioned to rest on an upper flange of a batter reservoir container 102. The side walls of the overflow container 96 are formed by a U-shaped metal frame 104 which has its ends pivotally supported by screws 106 (FIG. 3) secured to a bar attached to one of the ear portions 99 of the bottom wall 88. The frame 104 is thus pivotally supported by the screws 106 for precisely adjusting the level of the batter B within the overflow container 96, and the frame 104 is frictionally retained in a selected position.

As shown in FIG. 6, the flange of the reservoir container 102 is supported on one end by the top flange 22 of cooking vessel 18 and on the other end by a plate 110 which is mounted on a pair of vertical metal tubes 11 and 113 each having an inverted U-shaped upper end portion. As illustrated in FIG. 3, the batter for producing the waffles is added to the reservoir pan or container 102. To prevent the batter from settling, it is recirculated from the reservoir container 102 to the overflow container 96 where the batter is maintained at a preselected level by precisely adjusting the U-shaped frame 104. The upper end portions of the tubes 111 and 113 are connected by corresponding flexible transparent plastic tubes 116 and 117 which extend into the overflow container 96 and reservoir container 102, respectively. The lower end portions of the tubes 111 and 13 are connected through support fittings 119 (FIG. 6) to the inlet and outlet of a motor driven recirculating pump (not shown). The pump preferably incorporates a flexible vane rubber-like impeller which effectively pumps the batter without significantly changing its consistency.

As shown in FIG. 3, a T-shaped needle-like 120 is inserted between the upper end portion of the supply tube 113 and the surrounding end portion of the flexible plastic tube 117 to define small axially extending air passages on opposite sides of the pin 120. Thus as the batter is sucked from the reservoir container 102 through the tubes 113 and 117, air is sucked into the batter which flows to the recirculating pump, thereby assuring that a desired amount of air is maintained in batter. The flow of air is adjustable simply by adjusting the pin 120.

Figure 8:
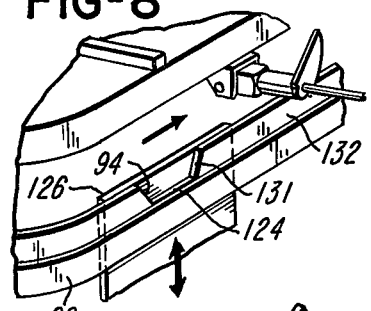
FIG. 8 is another fragmentary perspective view of the apparatus and showing the mechanism for by-passing the batter supply container with the forming molds.

Referring again to FIG. 2, as the roller sleeve 83 of each mold support arm assembly rolls or moves down the end ramp surface 94 of the cam track 92, the corresponding mold 70 is lowered or dipped into the batter B which is retained within the overflow container 96. Preferably, the level of the batter is maintained so that it is a fraction of an inch below the top surface of each mold 70 after the corresponding sleeve 83 moves downwardly into the notch or recess 124 extending from the end surface 94. As illustrated in FIG. 8, when it is desired for the forming molds 70 to bypass the batter overflow container 96, for example, when it is desired to shut down the machine, a lever (not shown) is actuated to move a by-pass rail or track 126 upwardly adjacent the recess 124 so that the mold support arms 72 do not move downwardly in the area of the batter supply container 96.

As the molds 70 and their support arms are advanced past the batter supply container 96, the roller sleeves 83 successively engage a ramp or cam end surface 131 of another cam track 132 (FIG. 2). The end surface 131 is effective to pivot each arm 72 upwardly so that the corresponding mold 70 is lifted from the batter supply container 96 and advances to a position over the cooking vessel 18 with a coated layer of batter. The cam track 132 has an inclined opposite end surface which lowers each arm 72 and its corresponding mold 70 with a coated layer of batter down into the hot cooking oil O (FIG. 5) within the vessel 18.

Referring to FIG. 5, as the molds 70 advance along the oval path of the conveyor unit 40, the coated layer of batter on each mold 70 is deep-fried or cooked within the oil to form a food article or waffle W (FIG. 5). As the molds 70 and their support arms 72 advance or move forwardly at the end of the cooking period, the cam element 84 on each support arm 72 engages a roller 136 which is supported by one end portion of an elongated horizontal track 138. The track 138 includes a vertical flange 139 which is supported by a pair of parallel spaced bracket members 141 secured to the cover member 64 for the chain conveyor unit 40. When each cam element 84 engages the roller 136, the corresponding arm 72 is rotated counterclockwise (FIG. 5), thereby rotating the corresponding mold 70 and the waffle W to a retracted position where the mold 70 and waffle W are positioned on an inclined angle above the level of the oil within the cooking vessel 18. The track 138 also includes a bottom horizontal flange 143 which is flush with the bottom surface of the roller 136 and serves to hold each cam element 84 in its rotated position while the corresponding mold 70 and waffle W are advanced forwardly from the cooking vessel 18 to a discharge station adjacent the forward end of the machine.

When each mold 70 and the waffle W formed thereon arrive at the discharge station, the cam element 84 of the corresponding support arm 72, advances past the forward end of the track 138 so that the arm 72 is free to rotate back to its normally stable position, as shown in FIG. 5. As each arm 72 rotates, it engages or impacts a stop member 146 (FIG. 6), and the impact vibrates the mole 70 so that the waffle W is released from the mold. In response to the impact, the waffle may drop downwardly onto an inclined wire rack 148 (FIG. 1) which is supported by an inclined metal discharge chute 150 releasably attached to the forward end portion of the cooking vessel 18 and resting on the base cabinet 15.

In the event that waffle W does not drop from its forming mold 70 when the mold support arm 72 impacts the stop member 146, the waffle is stripped from the mold 70 as the mold passes upwardly between a set of flexible stripping elements or coil compression springs 152 (FIG. 4) when the corresponding roller sleeve 83 engages the end surface 93 of the cam track 92. The stripping springs 152 are arranged in opposing pairs on opposite sides of the path of the molds 70 and are supported by a pair of blocks 154 mounted on a U-shaped bracket 156. An inclined sheet metal chute 158 slopes downwardly through the bracket 156 under the stripping springs 152 and has an upper flange 159 which rests upon the top flange of the reservoir container 102. The lower end portion of the chute 158 overlies the chute 150. Thus if a waffle remains adhered to a mold 70 after the mold support arm impacts the stop member 146, the stripping springs 152 are effective to peel the waffle from the mold 70 as it passes upwardly between the springs, as illustrated in FIG. 4. The stripping springs thereby assure that each cooked waffle is removed from its forming mold for discharge down the chutes 150 and 158 into a receptacle such as a container lined with a plastic bag.

From the drawings and the above description, it is apparent that a machine or apparatus constructed in accordance with the present invention, provides desirable features and advantages. For example, the configuration and support of the endles conveyor unit 40 relative to the cooking pan or vessel 18 not only provides for automatically and efficiently producing a high volume of waffle type food products but also provides for conveniently disassembling the conveyor unit 40 to facilitate cleaning of the apparatus. In addition, the construction and assembly of the mold support arms and their connections to the endless conveyor chain also provide for convenient disassembly and reassembly for cleaning. As another advantage, the elongated endless conveyor system provides for quickly advancing or moving the molds 70 at a higher velocity around the forward semi-circular end portion of the conveyor unit 40 and through the discharge station so that the molds have a minimum heat loss during the time period they are removed from the hot cooking oil.

Another desirable feature is provided by the simplified means for introducing air into the recirculated batter which is supplied to the overflow container 96, by simply inserting a needle to stretch the flexible plastic tube 117 to form small venturi-type air passages. A further desirable feature is provided by the use of the cam elements 84 for rotating each mold support arm to remove the corresponding mold from the hot cooking oil and for holding the mold and cooked waffle in a position for effective drainage while the mold and waffle are advanced from the cooking vessel to the discharge station. This structure also permits each arm 72 to be quickly disassembled and reassembled for cleaning purposes.

As mentioned above, the flexible stripping elements or springs 152 also assure that each finished waffle is removed from its forming mold and is not redipped into the batter supply. In addition, the construction and arrangement of the overflow container 96 within the reservoir container 102 not only provide for convenient disassembly for cleaning but also provide for precisely adjusting the level of the batter within the overflow container so that the batter flows to a predetermined height on each mold 70. This adjustment is especially desirable with changes in viscosity of the batter in order to maintain the batter level at a constant elevation. As is also apparent from FIG. 6, the entire apparatus may be quickly and conveniently disassembled for cleaning so that maximum sanitation can be maintained.

While the form of apparatus herein described constitutes a preferred embodiment of the invention, it is to be understood that the invention is not limited to this precise form of apparatus, and that changes may be made therein without departing from the scope and spirit of the invention as defined in the appended claims.

I claim:

1. In apparatus for automatically producing waffles or other food articles, and including means defining a cooking chamber for receiving a volume of cooking oil, means for heating the oil within said chamber, container means for receiving a supply of batter, means for maintaining the batter at a predetermined level within said container means, a plurality of article forming molds, power driven means for moving said molds along a path where said molds are successively immersed into the batter and then into the cooking oil and then delivered to a discharge station, and means at said discharge station for removing each cooked article from its corresponding mold, the improvement wherein said means for moving the molds along said path comprise an elongated endless conveyor, a plurality of arms connected to said conveyor at spaced intervals and supporting corresponding said molds for rotation relative to said conveyor, lever means connected to each of said arms for rotation therewith, and means positioned to engage said lever means on each said arm to effect rotation of said arm and mold for removing each cooked article from the cooking oil.

2. Apparatus as defined in claim 1 wherein said conveyor has generally parallel spaced horizontal runs extending over said chamber for receiving the cooking oil.

3. Apparatus as defined in claim 1 including meanns for introducing air into the supply of batter within said container means for maintaining the batter at a substantially uniform consistency.

4. Apparatus as defined in claim 1 wherein said container means comprise an overflow container disposed generally within a reservoir container, said overflow container includes adjustable means for selecting the level of batter within said overflow container and at which the batter overflows into said reservoir container, and means including a pump for recirculating the batter from said reservoir container into said overflow container.

5. Apparatus as defined in claim 4 wherein said adjustable means for selecting the level of batter within said overflow container comprise a vertically adjustably siide wall on said overflow container.

6. Apparatus as defined in claim 1 wherein said conveyor has generally parallel spaced runs extending generally horizonatally above said cooking chamber and includes a semi-circular end portion projecting horizontally outwardly from said cooking chamber and adjacent said discharge station, and means disposed under said end portion of said conveyor for driving said conveyor.

7. Apparatus as defined in claim 1 including a plurality of flexible spring-like elements located at said discharge station in spaced relation and positioned to receive said molds therebetween to assure removal of each cooked article from the corresponding said mold.

8. Apparatus as defined in claim 1 wherein said means defining said cooking chamber comprises an elongated generally rectangular vessel, and said conveyor comprises an endless chain having generally parallel spaced runs extending over said cooking chamber.

9. Apparatus as defined in claim 1 wherein container means for receiving the batter comprise a reservoir container having an open top, an overflow container removable mounted on said reservoir container and depending into said reservoir container, and said overflow container includes means for conveniently adjusting the level of batter within said overflow container.

10. In apparatus for automatically producing waffles or other food articles, and including means defining a cooking chamber for receiving a volume of cooking oil, means for heating the oil within said chamber, container means for receiving a supply of batter, a plurality of article forming molds, power driven means for moving said molds along a path where said molds are successively immersed into the batter and then into the cooking oil and then delivered to a discharge station, and means at said discharge station for removing each cooked article from its corresponding mold, the improvement wherein said means for moving the molds along said path comprise an elongated endless flexible conveyor having opposite generally U-shaped end portions connected by generally parallel-shaped side runs extending above the level of the cooking oil within said cooking chamber, one of said end portions of said conveyor projects horizontally outwardly from said cooking chamber adjacent said discharge station, and means disposed adjacent said one end portion for driving said conveyor.

11. In apparatus for automatically producing waffles or other food articles, and including means defining a cooking chamber for receiving a volume of cooking oil, means for heating the oil within said chamber, container means for receiving a supply of batter, means for supplying batter to said container means and for maintaining the batter at a predetermined level within said container means, said batter supplying means including a power operated recirculating pump connected to said container means by a batter suction line and a batter supply line, a plurality of article forming molds, power driven means for moving said molds along a path where said molds are successively immersed into the batter and then into the cooking oil for a predetermined time and then delivered to a discharge station, and means at said discharge station for removing each cooked article from its corresponding mold, the improvement comprising means defining an air suction passage connected to said batter suction line and effective for asperating air into the batter supplied to said container means for maintaining the batter at a generally uniform consistency.

12. Apparatus as defined in claim 11 wherein said batter suction line comprises a flexible tube, and said means defining said air suction passage comprises an elongated pin extending generally axially into said flexible tube.

13. In apparatus for automatically producing waffles or other food articles, and including means defining a cooking chamber for receiving a volume of cooking oil, means for heating the oil within said chamber, container means for receiving a supply of batter, means for maintaining the batter at a predetermined level within said container means, a plurality of article forming molds, power driven means for moving said molds along a path where said molds are successively immersed into the batter and then into the cooking oil and then delivered to a discharge station, and means at said discharge station for removing each cooked article from its corresponding mold, the improvement wherein said container means comprise an overflow container overlying a larger reservoir container, a pump container, a pump connected to recirculate the batter from said reservoir container to said overflow container, said overflow container including a bottom wall disposed adjacent a side wall, said side wall being separate from said bottom wall, and including means whereby said side wall of said overflow container is vertically adjustable relative to said bottom wall for precisely adjusting the level at which the batter flows over said side wall of said overflow container into said reservoir container.

* * * * *

UNITED STATES PATENT OFFICE
CERTIFICATE OF CORRECTION

Patent No. 4,026,202             Dated May 31, 1977

Inventor(s) Roman Szpur

It is certified that error appears in the above-identified patent and that said Letters Patent are hereby corrected as shown below:

Column 3, line 33, "reduced" should be --reducer--.

Column 4, line 38, after "of" insert --the--.

Column 4, line 40, "11" should be --111--.

Column 4, line 52, "13" should be --113--.

Column 4, line 67, insert "the" before --batter--.

Column 5, line 60, "mole" should be --mold--.

Column 6, line 1, after "that" insert --a--.

Column 6, line 29, "endles" should be --endless--.

Column 7, line 41, "meanns" should be --means--.

Column 7, line 42, after "batter" insert --received--.

UNITED STATES PATENT OFFICE
CERTIFICATE OF CORRECTION

Patent No. 4,026,202            Dated May 31, 1977

Inventor(s) Roman Szpur

It is certified that error appears in the above-identified patent and that said Letters Patent are hereby corrected as shown below:

Column 7, line 57, "ably" should be --able--; same line, "siide" should be --side--.

Column 8, line 29, "parallel-shaped" should be --parallel-spaced--.

Column 9, lines 9 and 10, delete "a pump container".

Signed and Sealed this ninth Day of August 1977

[SEAL]

Attest:

RUTH C. MASON
*Attesting Officer*

C. MARSHALL DANN
*Commissioner of Patents and Trademarks*